March 15, 1932.  C. H. MONROE  1,849,149
INTERNAL COMBUSTION ENGINE
Filed March 3, 1930    2 Sheets-Sheet 1
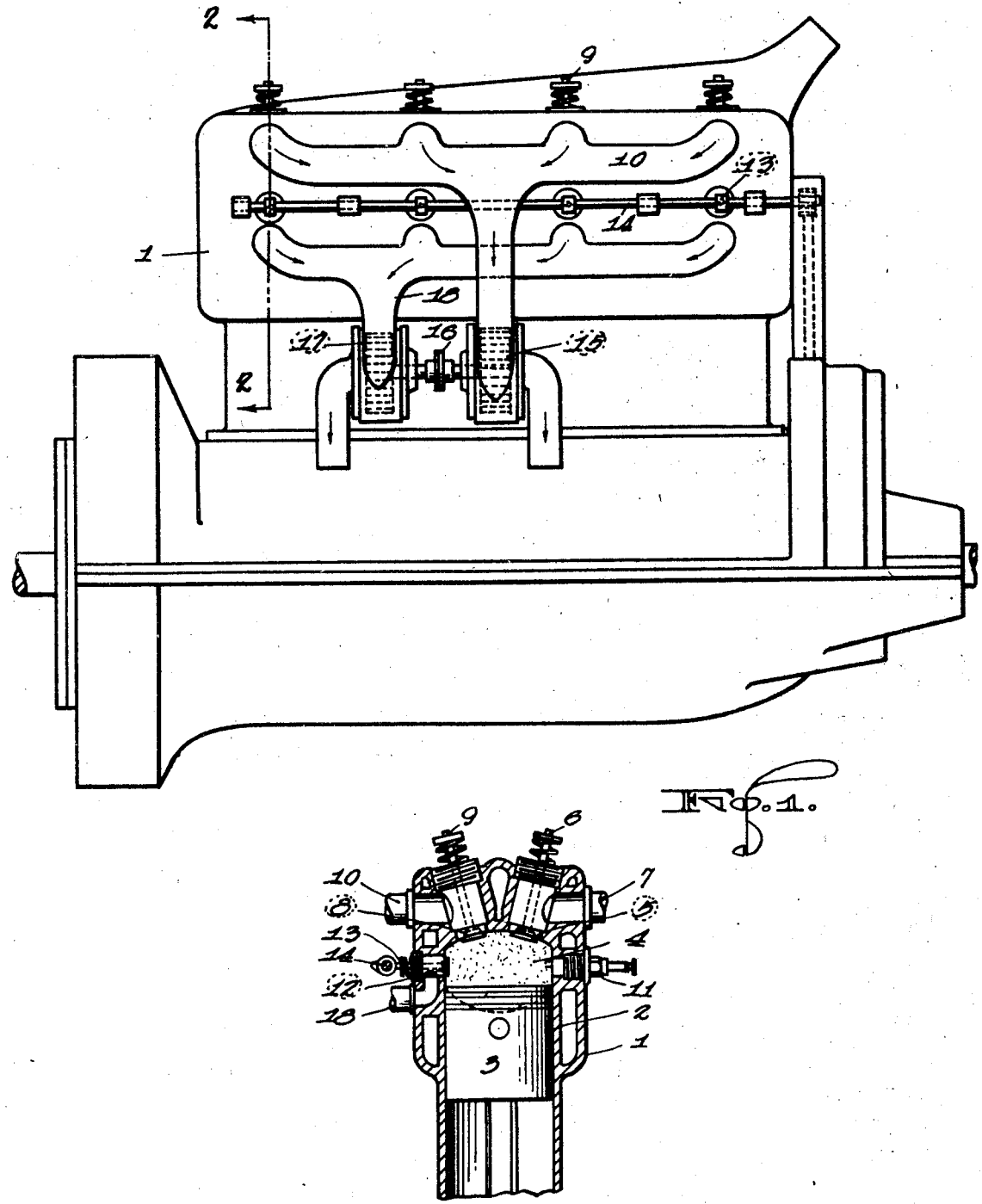
INVENTOR.
CHARLES H. MONROE.
BY Munn & Co.
ATTORNEYS.

March 15, 1932.  C. H. MONROE  1,849,149
INTERNAL COMBUSTION ENGINE
Filed March 3, 1930  2 Sheets-Sheet 2

INVENTOR.
CHARLES H. MONROE.
BY Munn&Co.
ATTORNEYS.

Patented Mar. 15, 1932

1,849,149

UNITED STATES PATENT OFFICE

CHARLES H. MONROE, OF BERKELEY, CALIFORNIA

INTERNAL COMBUSTION ENGINE

Application filed March 3, 1930. Serial No. 432,793.

The present invention relates to improvements in internal combustion engines, and its principal object is to produce a scavenging effect at the end of the exhaust stroke whereby the combustion chamber is cleared entirely of all products of combustion before a new charge is allowed to enter.

My invention is particularly intended to be used in connection with internal combustion engines constructed on the overhead valve principle, since in engines of this type the piston, even at the end of its exhaust stroke remains a considerable distance away from the top of the combustion chamber so that considerable space is left for products of combustion to remain in the chamber and to mix with the new charge.

A further object of the present invention is to use the force by which the products of combustion are exhausted from the engine for driving my device for creating suction at the end of the exhaust stroke. A further object of the invention is to provide suitable valve mechanism and operating means for the same whereby the results desired may be obtained.

Further objects and advantages of my invention will appear as the specification proceeds.

The preferred form of my invention is illustrated in the accompanying drawings in which Figure 1 shows a side view of a conventional multi-cylinder power plant having my improvement incorporated therein, Figure 2 a vertical section taken along line 2—2 of Figure 1.

Figure 3:
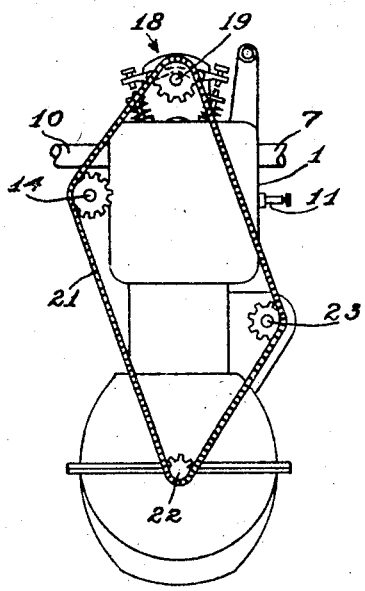

Figure 3 a front view of the power plant illustrating means for operating the valves in timed relation; and Figures 4 to 7 diagrammatic views illustrating the various positions of the valves, crank and pistons through a complete cycle.

While I have shown only the preferred form of my invention I wish to have it understood that various changes or modifications may be made within the scope of the claims hereto attached without departing from the spirit of the invention. Particularly it should be noted that while in the drawings and in the specification my invention is disclosed as applying to an internal combustion engine operating on the four cycle principle and having overhead poppet valves, that the principles of my invention may successfully be applied to engines of different character.

The power plant 1 is shown as comprising four cylinders 2, each having a piston 3 reciprocable therein, which forms a combustion chamber 4 in the cylinder. The latter is provided with an intake port 5 controlled by an intake valve 6 and communicating with an intake manifold 7 in the conventional manner. The cylinder is further provided with an exhaust port 8 controlled by the exhaust valve 9 and leading to the exhaust manifold shown at 10. A spark plug 11 is provided in the usual manner, and the intake and exhaust valves 6 and 9 are controlled by a suitable cam mechanism 18, the cams being mounted on the cam shaft 19.

In addition to the ports already described, I provide a second exhaust port 12 controlled by a valve 13 which latter may be operated to open at predetermined times by means of a cam shaft 14. The timing is such that the valve opens just before the end of the exhaust stroke and closes prior to the opening of the intake valve 6 and may be effected by the means illustrated in Figure 3 in which a common chain 21 is shown as passing over pinions mounted on the crank shaft 22, the cam shaft 14, the cam shaft 19, and a generator shaft 23.

The principal idea of the present invention is to provide suction at the second exhaust port at the time when the piston has practically reached the limit of its exhaust stroke so that the products of combustion remaining in the chamber at that time are drawn out through the second exhaust port.

Suction is created by utilizing the products of combustion driven from the combustion chamber during the exhaust stroke of the piston 3. These products of combustion pass through the exhaust manifold 10 and are made to drive an impeller 15 rotatably mounted in the exhaust manifold. This impeller 15 drives through a suitable coupling 16, a second impeller 17 rotatably mounted in the exhaust manifold 18, connecting with the second exhaust port 12. When the engine is working there will be negative pressure in the second exhaust manifold at all times, and when the valve 13 is opened near or at the end of the exhaust stroke, the products of combustion will be sucked out of the combustion chamber so that the latter is absolutely clear of the old charge before the new charge enters, which allows a correspondingly larger charge to be taken in and which renders the new charge more effective, since every part of it is adapted to be turned into energy.

Figure 4:
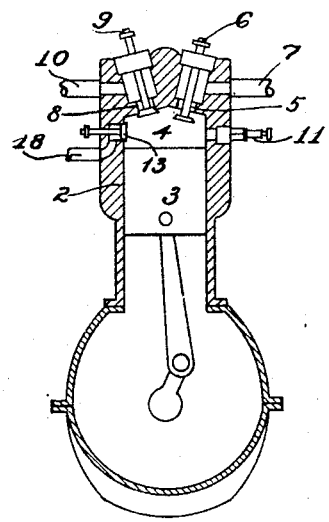
Figure 5:
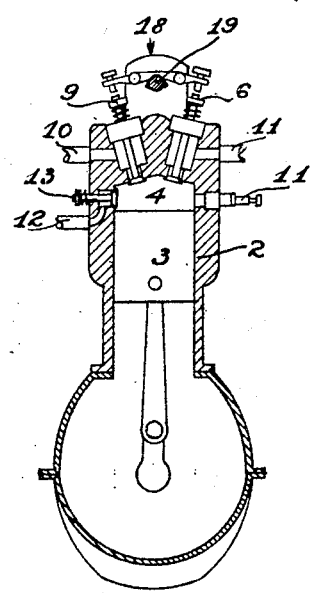
Figure 6:
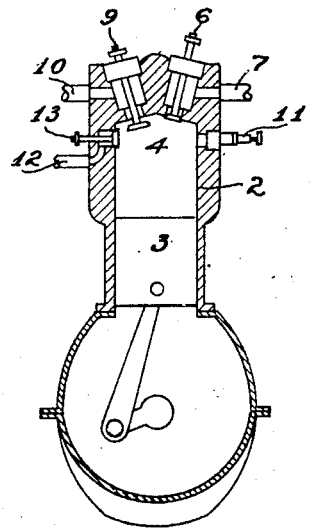
Figure 7:
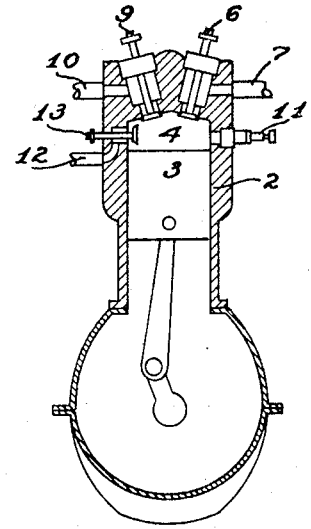

Figures 4 to 7 show the relative positions of the valves, the crank shaft and the pistons throughout a complete cycle. In Figure 4 the piston is shown at the beginning of the intake stroke, the intake valve 6 being opened and the exhaust valves 9 and 13 being closed. Figure 5 shows the piston at the end of the compression stroke or the beginning of the power stroke, with all the valves closed. Figure 6 shows the piston at the end of the power stroke and the beginning of the exhaust stroke, with the main exhaust valve 9 open and the intake valve and the auxiliary exhaust valve closed. In Figure 7 the piston is shown as nearing the end of the exhaust stroke and at this time the auxiliary exhaust valve 13 is open while the two other valves are closed.

I claim:

1. In an engine of the character described, a cylinder, a piston movable therein, an intake port for admitting a charge into the cylinder, an exhaust port for allowing products of combustion to escape therethrough, an impeller mounted for operation by the said gases, a second exhaust port in the cylinder, and a second impeller mounted so as to be driven by the first impeller and to produce suction at the second exhaust port.

2. In an engine of the character described, a cylinder, a piston movable therein, an intake port for admitting a charge into the cylinder, an exhaust port for allowing products of combustion to escape therethrough, an impeller mounted for operation by the said gases, a second exhaust port in the cylinder, and a second impeller mounted so as to be driven by the first impeller and to produce suction at the second exhaust port, with means for opening and closing the two exhaust ports in timed relation.

CHARLES H. MONROE.